(12) United States Patent
Wacheux et al.

(10) Patent No.: US 9,775,203 B2
(45) Date of Patent: Sep. 26, 2017

(54) TRANSIENT CURRENT PEAK LIMITER FOR VARIATIONS IN LED LOADS

(71) Applicant: Valeo Vision, Bobigny (FR)

(72) Inventors: Patrick Wacheux, Bois le Roy (FR); Massourang Diallo, Carrieres sous Poissy (FR)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 15/152,903

(22) Filed: May 12, 2016

(65) Prior Publication Data

US 2016/0338160 A1 Nov. 17, 2016

(30) Foreign Application Priority Data

May 13, 2015 (FR) ...................................... 15 54311

(51) Int. Cl.

| H05B 33/08 | (2006.01) |
|---|---|
| B60Q 1/00 | (2006.01) |
| B60Q 1/28 | (2006.01) |
| B60L 1/14 | (2006.01) |
| F21S 8/10 | (2006.01) |
| H05B 37/03 | (2006.01) |
| B60Q 1/14 | (2006.01) |

(52) U.S. Cl.
CPC ............ *H05B 33/0815* (2013.01); *B60L 1/14* (2013.01); *B60Q 1/0076* (2013.01); *B60Q 1/1461* (2013.01); *B60Q 1/28* (2013.01); *F21S 48/1747* (2013.01); *H05B 33/083* (2013.01); *H05B 33/0845* (2013.01); *H05B 37/038* (2013.01)

(58) Field of Classification Search
CPC .............. H05B 33/083; H05B 33/0815; H05B 33/0845; H02M 3/33507; H02M 1/32; Y02B 20/347
USPC ................... 315/82, 186, 193, 219, 307, 312
See application file for complete search history.

(56) References Cited

U.S. PATENT DOCUMENTS

| 8,624,513 B2 * | 1/2014 | Moss ................. H05B 33/0815 315/193 |
|---|---|---|
| 8,633,659 B2 | 1/2014 | Tanaka |
| 2011/0260617 A1 | 10/2011 | Tanaka |

* cited by examiner

*Primary Examiner* — Haissa Philogene
(74) *Attorney, Agent, or Firm* — Jacox, Meckstroth & Jenkins

(57) ABSTRACT

A device and a method for driving the supply of power to a plurality of light sources that is made up of a first group of light sources comprising at least one light source, which first group of light sources is connected in series with at least one second group of light sources comprising at least one light source. The device comprises a supply circuit to which the plurality of light sources is connected as a load. According to the inventive measures, it becomes possible to short at least one of the groups of light sources without causing high intensity transient current peaks in the light sources that are not shorted.

17 Claims, 7 Drawing Sheets

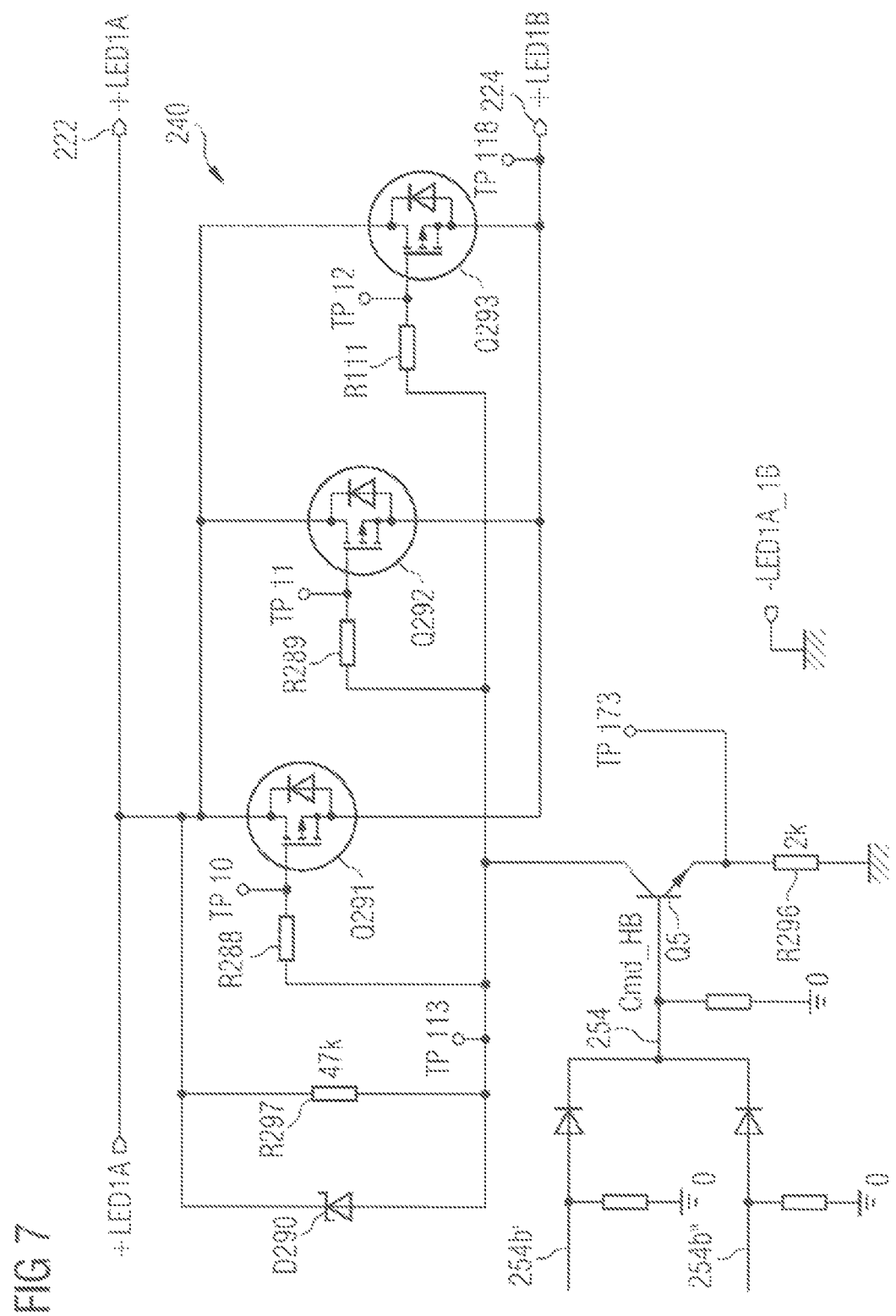

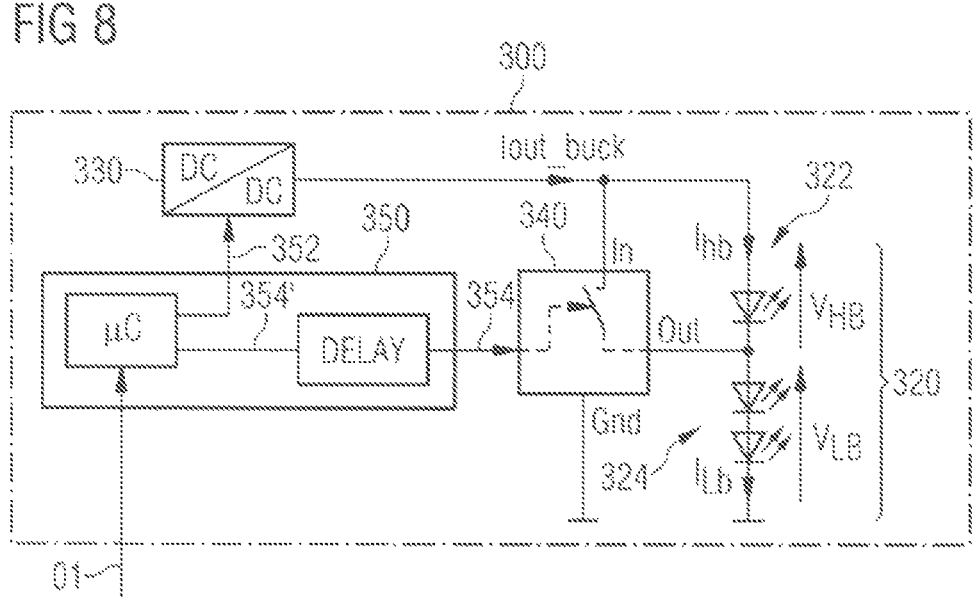
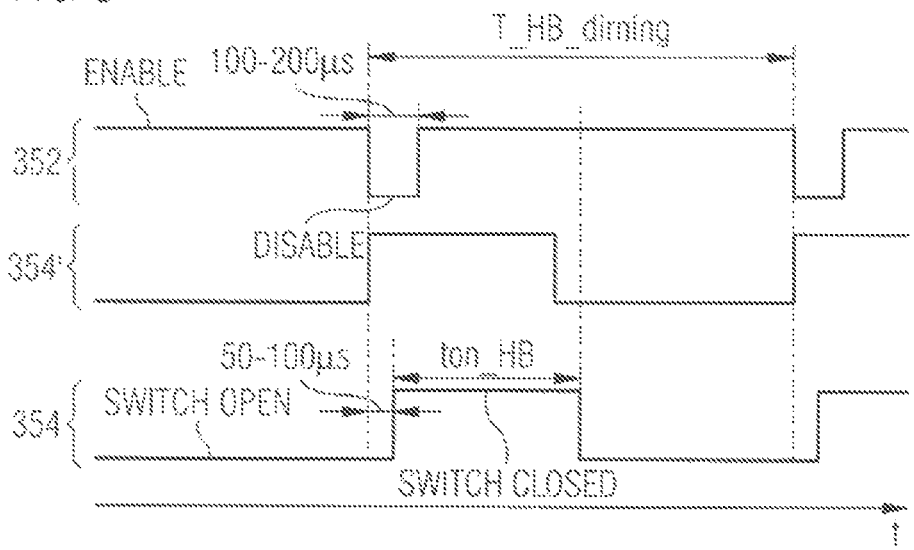

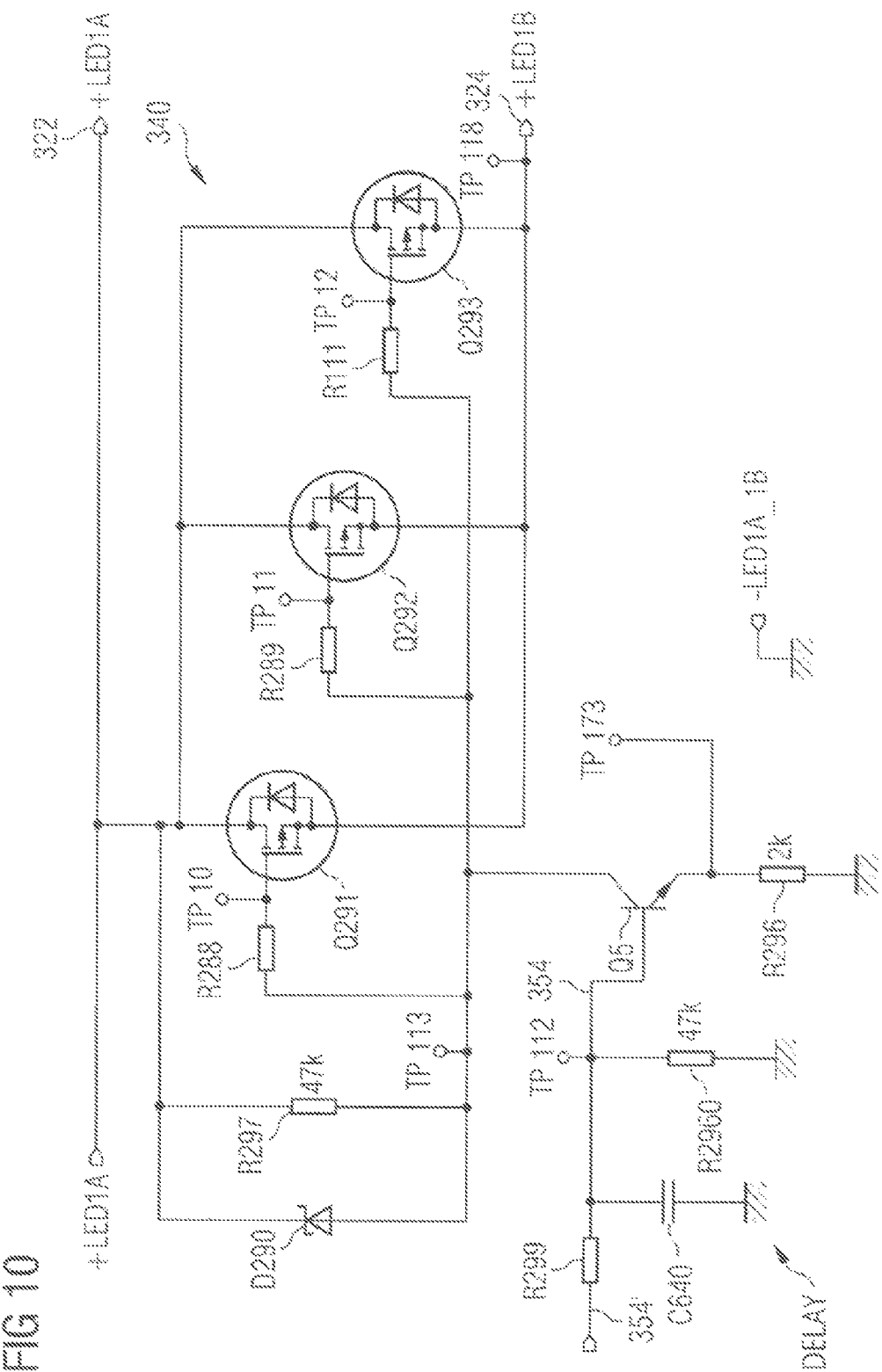

TRANSIENT CURRENT PEAK LIMITER FOR VARIATIONS IN LED LOADS

CROSS-REFERENCE TO RELATED APPLICATIONS

This application claims priority to the French application 1554311 filed May 13, 2015, which applications are incorporated herein by reference and made a part hereof.

BACKGROUND OF THE INVENTION

1. Field of the Invention

The invention concerns the field of lighting devices for automotive vehicles, and more precisely means for driving the supply of power to light sources inside such devices.

2. Description of the Related Art

In the field of lighting devices for automotive vehicles, and particularly light-signaling devices, it is becoming ever more common to use light sources with semiconductor components, such as light emitting diodes, LED, for example. Compared with incandescent or discharge light sources, the use of LEDs makes it possible to create original optical signatures by placing a plurality of LEDs along a predefined contour, for example. Furthermore, the power consumption of LEDs is generally lower than that of traditional light sources. An LED element emits light radiation of a predefined intensity when it carries an electric current of a predefined intensity that is above a threshold value.

In a known manner, a series connection of multiple LEDs is connected as a load for a device for driving the supply of power to the LEDs. Such a device converts an electric current of a first intensity, which is provided in a general manner by an internal current source of the automotive vehicle, such as a battery, into an electric current of a second, different intensity. The voltage applied to the terminals of the series connection needs to be such that all the LEDs in the connection are able to emit light radiation.

For a given lighting function, it is known practice to provide two modes of lighting having different light intensities. One example is front lighting in high beam, HB, and low beam, LB, modes, respectively. It is known practice to implement this type of functionality by connecting two groups of LEDs in series, the LEDs in their entirety being powered by the same means for driving the supply of power. A switch allows one of the two groups of LEDs in the connection to be shorted. When a short circuit is activated, the light intensity emitted by all of the LEDs is reduced since one of the two groups of LEDs does not emit light radiation. This mode corresponds to the low beam mode, for example. The load on the converter is likewise instantaneously reduced when the short circuit is activated. This abrupt change in the load gives rise to large transient current peaks through the LEDs that continue to be powered. It has been observed that these peaks can have intensities of above 4 A and can take place over approximately 20 μs. However, most of the available LED elements can withstand only current peaks up to approximately 2.5 A. In such known implementations, there is therefore a real risk of damage to the light sources.

It has been proposed to absorb the transient peaks in such connections by absorbing the energy in a resistor that is selectively connected in the load circuit by a transistor when a peak is detected. Such systems need to be resized for each connection of the load, however, and represent an overall loss of energy since part of the energy produced is lost in the resistor.

SUMMARY OF THE INVENTION

The aim of the invention is to overcome at least one of the problems posed by the prior art. More precisely, the invention proposes a device and a method that allows the appearance of large transient current peaks to be prevented in connections as have just been described, rather than reducing the impact of such peaks once they have appeared.

The subject of the invention is a device for driving the supply of power to a plurality of light sources that is made up of a first group comprising at least one light source, which first group is connected in series with at least one second group comprising at least one light source. The device comprises a supply circuit to which the plurality of light sources is connected as a load. The device likewise comprises switching means that allow at least one of the first and second groups or the whole plurality of light sources to be powered selectively. The device is noteworthy in that it comprises control means that allow control of the activation state of the supply circuit and the state of the switching means when a changeover from powering the whole plurality of light sources to powering one or just some of the groups of light sources is required.

Preferably, the device for driving the supply of power is a device for driving the supply of power for a lighting system of an automotive vehicle.

The supply circuit may preferably comprise a DC/DC converter, a converter of boost/buck type, or, by way of example, a voltage-reducing converter of buck type.

Preferably, the plurality of light sources may be made up of a first group comprising at least one light source, which first group is connected in series with a second group comprising at least one light source.

The control means may preferably be configured so as to perform the following steps when a changeover from powering the whole plurality of light sources to powering the second group of light sources is required:
  reception of a signal indicating the required changeover, then
  deactivation of the supply circuit, then
  changeover of the switching means, while the supply circuit is deactivated, so as to short the first group of light sources;
  reactivation of the supply circuit.

In a preferred manner, the supply circuit is deactivated for 100 to 200 microseconds on reception of the signal. The changeover of the switching means may advantageously be performed with a delay relative to the reception of the signal indicating the required changeover. Other deactivation periods are conceivable depending on the electronic components used in the device.

The delay may preferably be of the order of 50 to 100 microseconds. Other delay periods are conceivable depending on the technical features and properties of the electronic components used in the device.

Preferably, the control means may comprise an electronic circuit that performs the changeover delay function.

The control means may preferably comprise an electronic circuit that performs the deactivation function for the drive circuit.

In a preferred manner, the control means may comprise a microcontroller element configured so as to perform the changeover delay function and/or the deactivation function for the drive circuit.

The control means may, in a preferred manner, moreover comprise combinational logic means for signals transmitted by the microcontroller element. These may be OR or NOR logic gates, for example.

The first and/or second group may preferably comprise a plurality of light sources connected in series.

Preferably, the light sources may comprise a semiconductor component, particularly a light emitting diode, LED, a power light emitting diode or an organic light emitting diode. They may likewise comprise a laser diode.

The subject of the invention is also a lighting device for an automotive vehicle. The device comprises means for driving the supply of power to a plurality of light sources that is made up of a first group comprising at least one light source, which first group is connected in series with a second group comprising at least one light source. The lighting device is noteworthy in that the drive means are in accordance with the device according to the invention. Preferably, the lighting device may be a signaling device of an automotive vehicle.

The first group alone may preferably implement the "low beam" lighting function, and the first and second groups together may advantageously implement the "high beam" lighting function of an automotive vehicle.

The subject of the invention is also a method for driving the supply of power to a plurality of light sources that is made up of a first group comprising at least one light source, which first group is connected in series with a second group comprising at least one source. The method comprises the following steps:

provision of a supply circuit to which the plurality of light sources is connected as a load;

provision of switching means that allow the second group or the plurality of light sources to be powered selectively.

The method is noteworthy in that it moreover comprises the following step:

controlling the activation state of the supply circuit and the state of the switching means when a changeover from powering the whole plurality of light sources to powering the second group of light sources is required.

Preferably, the method may comprise the following steps:

reception of a signal indicating the required changeover, then deactivation of the supply circuit, then changeover of the switching means, while the supply circuit is deactivated, so as to short the first group of light sources;

reactivation of the supply circuit.

The measures of the invention allow effective reduction of the transient current peaks that can appear in known devices when some of the light sources connected in series with a supply device are temporarily shorted. Instead of dissipating a temporal energy surplus in a resistor, causing losses, the invention uses intelligent control of the control signals in order to avoid the appearance of the current peaks. This has the advantage of not losing the energy surplus and of not having to use dissipation resistors, which use up substantial space on a printed circuit. Moreover, according to preferred embodiments, the solution according to the invention can be scaled without having to resize the electronic components involved. The presented embodiments allow implementation of the measures according to the invention either by electronic circuits or by programming of a microcontroller element or by means of a hybrid solution involving electronic circuits and a programmable element. This flexibility allows the invention to be applied to numerous existing lighting devices, the longevity and durability of which are thus increased.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the aid of the exemplary description and the drawings, among which:

FIG. 7 shows an implementation example for a detail of a device according to a preferred embodiment of the invention;

FIG. 8 is a schematic illustration of a device according to a preferred embodiment of the invention;

FIG. 9 is a timing diagram for control signals involved in the operation of a device according to a preferred embodiment of the invention; and FIG. 10 shows an implementation example for a detail of a device according to a preferred embodiment of the invention.

DETAILED DESCRIPTION OF THE PREFERRED EMBODIMENTS

Figure 1:
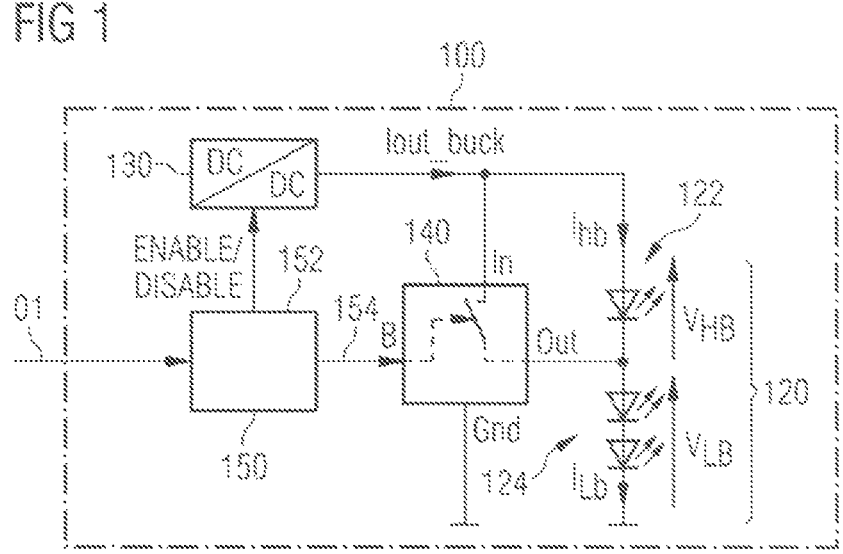
FIG. 1 is a schematic illustration of a device according to a preferred embodiment of the invention.

In the description that follows, similar reference numerals will be used to describe similar concepts throughout the various embodiments of the invention. Thus, the numerals 100, 200 and 300 describe a device in three different embodiments that are in accordance with the invention.

Unless specifically indicated to the contrary, technical features described in detail for a given embodiment can be combined with the technical features described within the context of other embodiments described by way of example and without limitation.

FIG. 1 schematically shows a device 100 according to the invention in a preferred embodiment. Preferably, it is a device 100 for driving the supply of power that is used in a lighting device, such as a signaling device, of an automotive vehicle. In a known manner, such a device 100 comprises a supply circuit 130 that is capable of converting a direct current of a first intensity provided by a current source internal to the automotive vehicle, such as a battery, into a load current of a different intensity. Such supply means or supply circuit 130 are known to have an input called "enable" that allows them to be respectively activated or deactivated using a control signal. A plurality of light sources 120, represented by way of example by light emitting diodes, LEDs, is connected as a load for the supply means 130. The plurality of light sources 120 follow one another in the connection. The plurality of light sources 120 is divided up into a first group of light sources 122 and at least one second group of light sources 124. To clarify FIG. 1, a single second group of light sources 124 is illustrated, without limiting the invention to this example. In a preferred application of the device 100, the second group of light sources 124 implements the "low beam" lighting function of a signaling device of an automotive vehicle. When the first and second groups of light sources 122, 124 are powered, the "high beam" lighting function, which necessitates a higher light intensity, is implemented. Switching means 140 allow toggling between the two (or more) modes of operation by shorting at least one of the groups of light sources 122, 124. In the example shown, the switching means 140 allow the first group of light sources 122 to be selectively shorted.

Finally, the device 100 comprises control means 150 that are configured to control firstly the supply means 130 using a control signal 152 and secondly the switching means 140 using a control signal 154.

The operation of the control means 150 is described with regard to the timing diagram of FIG. 1. The input of the control means 150 is illustrated by the signal 01. This signal 01 represented in binary fashion can come from a computer system, not shown, internal to the automotive vehicle, for example. It indicates the wish of the driver to turn on either the second group of light sources or LEDs 124 ("low beam") or all the first and second group of light sources or LEDs 122, 124 ("high beam"). When a change from the "high beam" mode to the "low beam" mode is requested by the signal 01, the control means 150 firstly deactivate the supply means 130, so that none of the LEDs 122, 124 are powered on a temporary basis. This is accomplished using the binary control signal 152. While the supply means 130 are deactivated, the switching means 140, which are initially in an open state, are toggled to the closed state, thus shorting the first group of light sources or LEDs 122. This is accomplished by the binary control signal 154. Once the toggling has been accomplished, the control means 150 reactivate the supply means 130 using the control signal 152. When the supply resumes, the supply means 130 are capable of providing a current suited to the load that has just been reduced by shorting some of the light sources or LEDs 122, 124 in the series connection. Thus, the appearance of a large transient current peak, which is potentially dangerous for the second group of light sources or LEDs 124, is avoided. While solutions known in the art can produce transient peaks of approximately 4.1 A, by using the measures of the invention, these peaks have been reduced to 2.2 A, which is an acceptable order of magnitude for most available light sources or LEDs. Obviously, afterwards, the device 100 can be toggled back to "high beam" mode in order to return to its initial state.

The control signal 154 from the switching means 140 is therefore a delayed image of the received signal 01. In typical embodiments, the delay is preferably 50 to 100 µs, whereas other values can be considered by a person skilled in the art. So that the toggling of the switching means 140 is able to be accomplished when the supply for the light sources or LEDs 122, 124 is cut off, the control signal 152 preferably deactivates the supply means 130 approximately 50 ms before the toggle command is transmitted. The deactivation control signal 152 is generally provided immediately on the rising edge of the signal 01. The supply means 130 are preferably reactivated only after approximately 100 µs, once the toggle command has been transmitted. Obviously, the exact values of these delays can differ according to the specific applications, without departing from the scope of the present invention.

Figure 2:
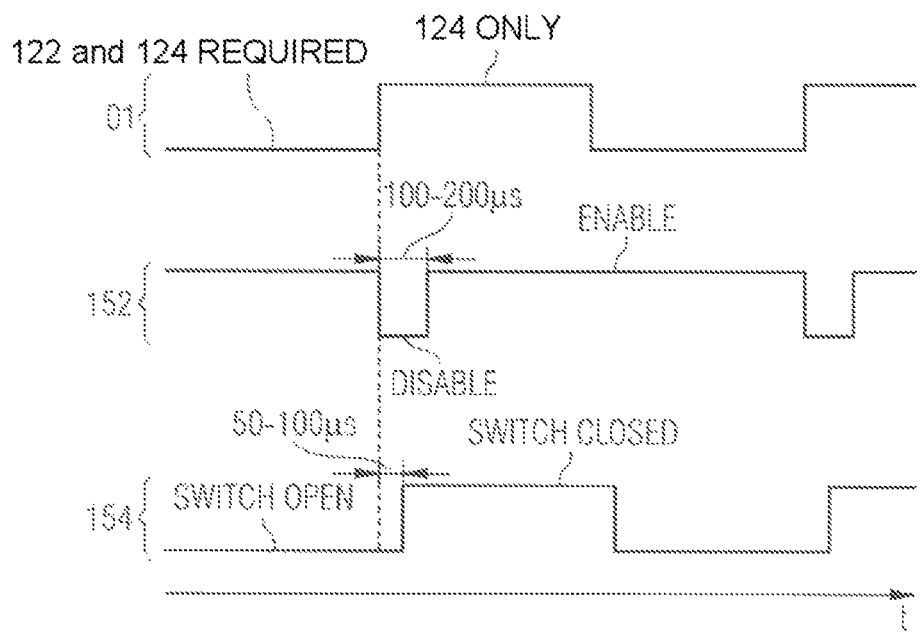
FIG. 2 is a timing diagram for control signals involved in the operation of a device according to a preferred embodiment of the invention.
Figure 3:
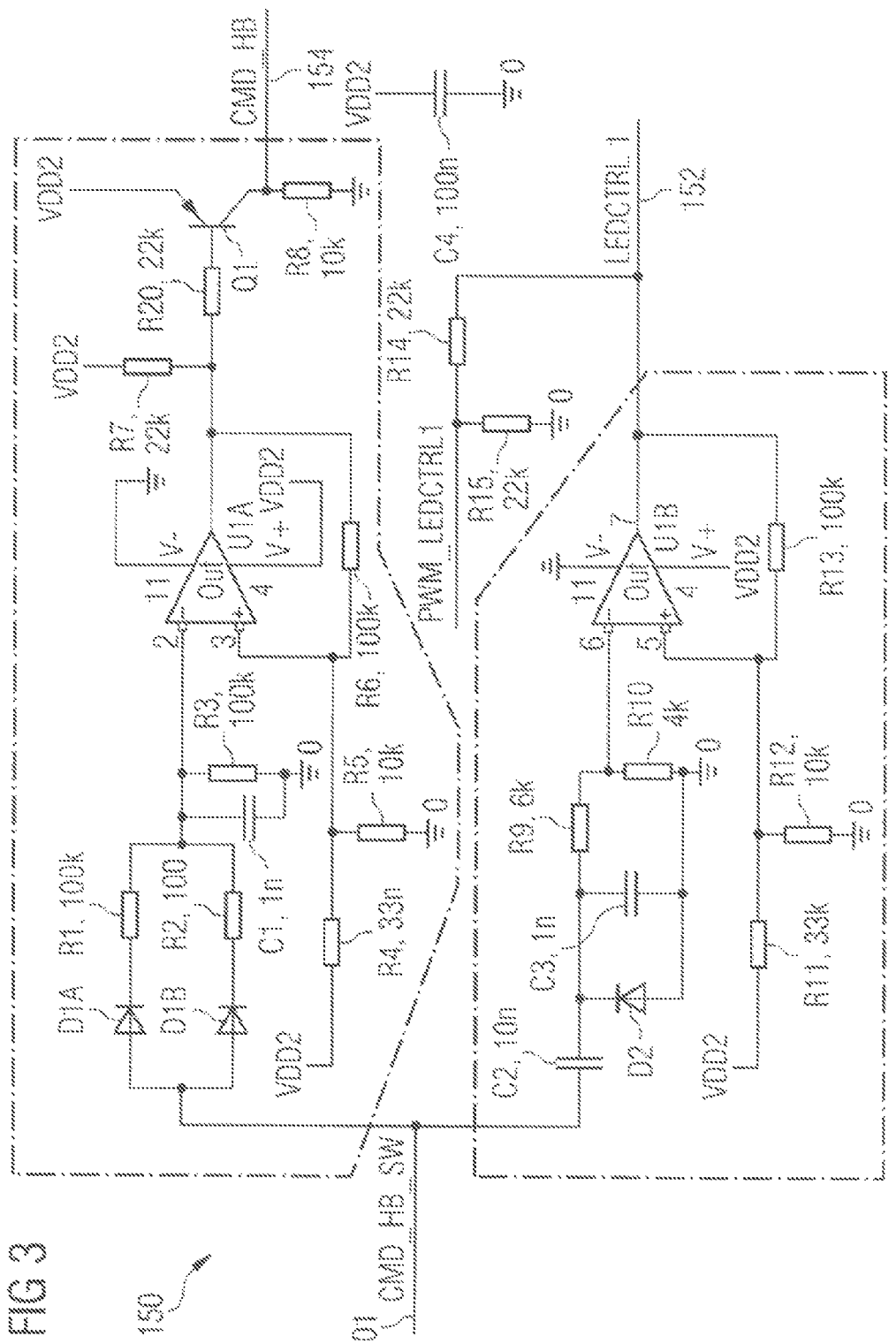
FIG. 3 shows an implementation example for a detail of a device according to a preferred embodiment of the invention.

A person skilled in the art will be able to implement this logic functionality in several ways. By way of example, FIG. 3 shows an electronic circuit that is capable of producing the control signals 152, 154 shown in the timing diagram of FIG. 2 on the basis of the input signal 01.

Figure 4:
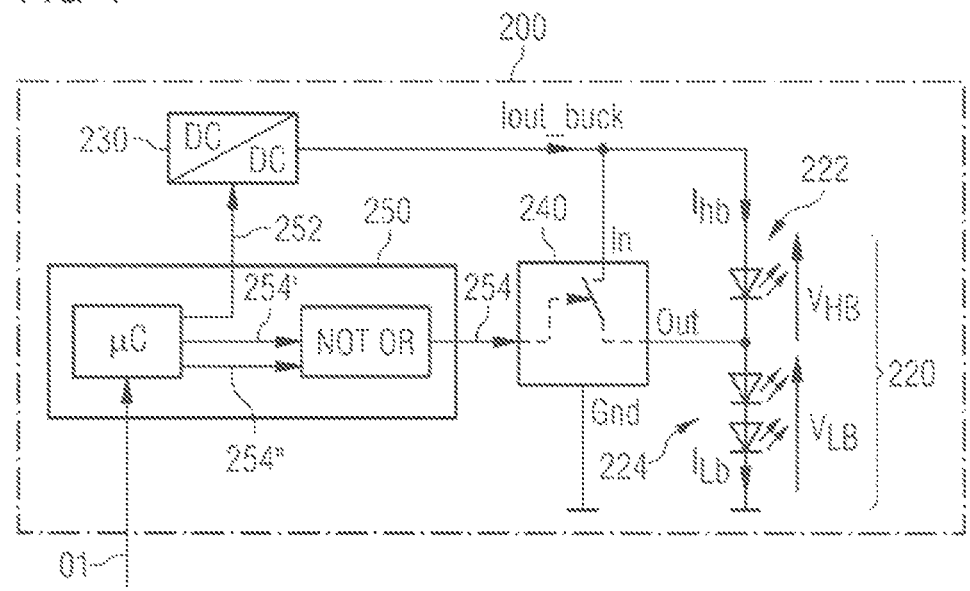
FIG. 4 is a schematic illustration of a device according to a preferred embodiment of the invention.
Figure 5:
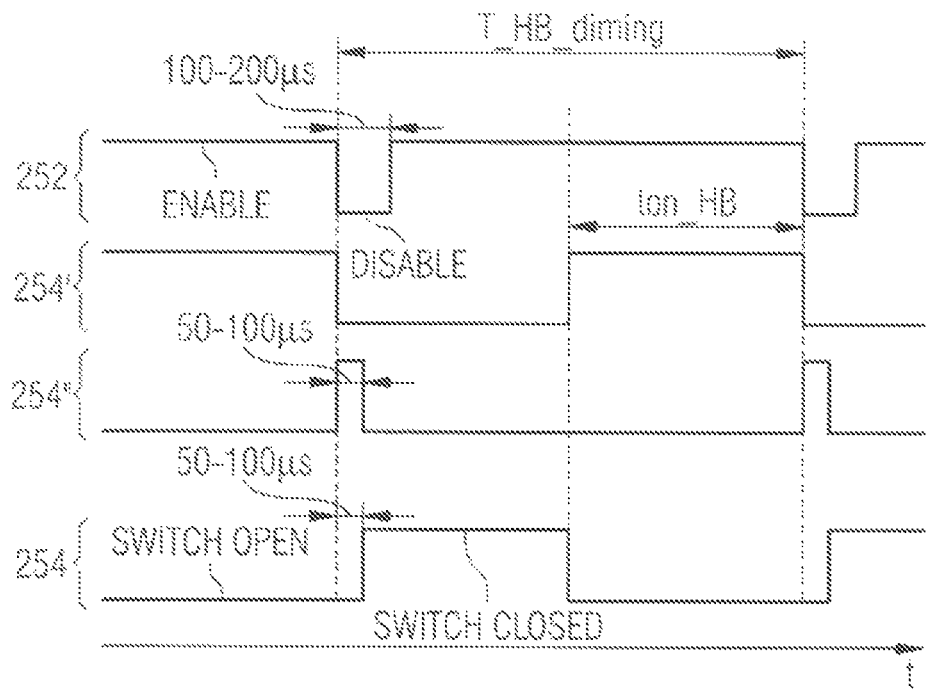
FIG. 5 is a timing diagram for control signals involved in the operation of a device according to a preferred embodiment of the invention.

The embodiment of the device 200 illustrated by FIG. 4 is similar to that illustrated by FIG. 1. However, the control means or microcontroller 250 are provided by a microcontroller element that allows generation of the control signals 252, 254', 254", and by an electronic circuit implementing the NOR logic function. The control means or microcontroller 250 is programmed so as to produce the control signals 252, 254' and 254" as shown in the timing diagram of FIG. 5. The input signal 01 is not represented therein. The state transitions of the three control signals 252, 254' and 254" are in sync with the rising edge of the signal 01. The control means or microcontroller 250 first deactivates the supply means 230 by changing the state of the binary control signal 252 to "disable". At the same time, a first control signal 254', which is an image of the signal 01, is transmitted to an output of the control means or microcontroller 250. The control signal 254" is transmitted to a different output of the control means or microcontroller 250 and represents the delay to be applied to the rising edge of the switching signal. Finally, the NOR logic gate combines the two control signals 254', 254" in order to generate the control signal 254, which controls the toggling of the switching means 240 to the closed state. Once the toggle command has been generated, the supply means 230 are reactivated by the control signal 252 after a predetermined time lapse.

Figure 6:
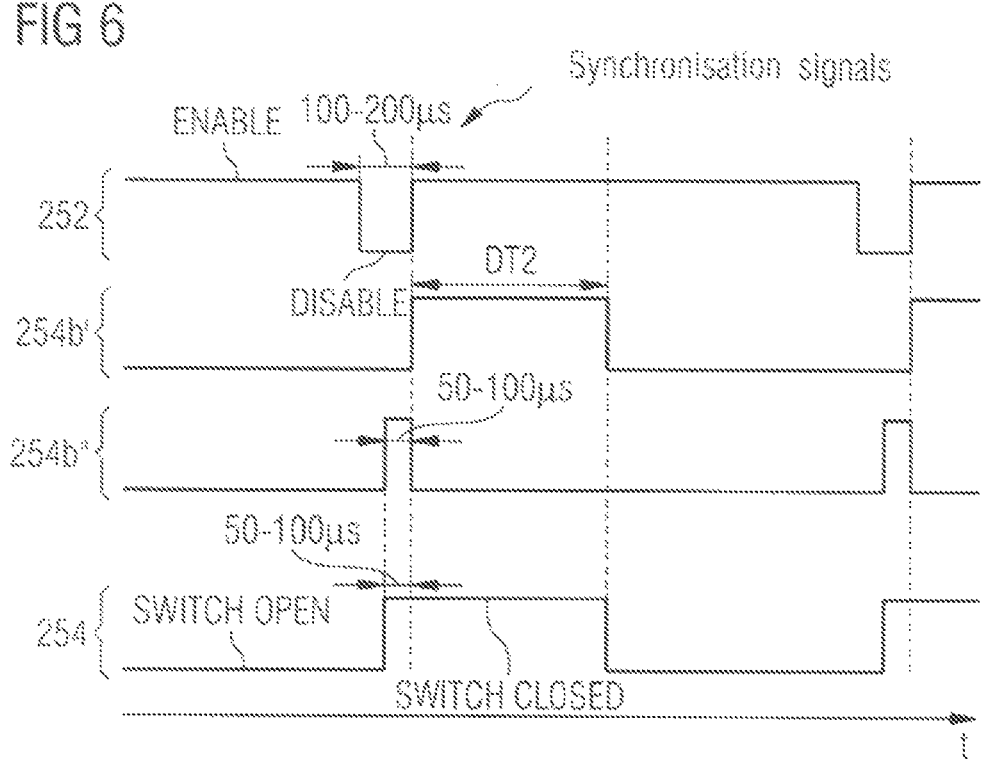
FIG. 6 is a timing diagram for control signals involved in the operation of a device according to a preferred embodiment of the invention.

FIG. 6 shows an alternative example of the control signals 252, 254, 254b', 254b" generated by the control means or microcontroller 250. In this case, the control signals 254b' and 254b" are in sync with the rising edge of the control signal 252 for the supply means 230. As for the previous embodiment, a logic gate, this time of OR type, allows the control signals 254b', 254b" to be combined in order to generate the control signal 254 for the switching means 240. A corresponding implementation example for an electronic circuit for providing the OR function and the switching means 240, particularly involving transistors, is illustrated by FIG. 7.

The embodiment of the device 300 illustrated by FIG. 8 is similar to the embodiments described previously. However, the control means or microcontroller 350 are provided by a programmed microcontroller element that allows generation of control signals 352, 354' and by an electronic circuit implementing a delay.

The control means or microcontroller 350 is programmed so as to produce the signals 352 and 354' as shown in the timing diagram of FIG. 9. The input signal 01 is not represented therein. The state transitions of the two signals 352 and 354' are in sync with the rising edge of the signal 01. The control means or microcontroller 350 first deactivates the supply means 330 by changing the state of the binary signal 352 to "disable". At the same time, a control signal 354', which is an image of the signal 01, is transmitted to an output of the control means or microcontroller 350. The electronic circuit shown at the bottom of FIG. 10 delays the signal 354' in order to obtain the control signal 354 for the switching means 340.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for driving the supply of power to a plurality of light sources that is made up of a first group of light sources comprising at least one light source, which said first group of light sources is connected in series with at least one second group of light sources comprising at least one light source, said device comprising:
    a supply circuit to which said plurality of light sources is connected as a load;
    switching means that allow at least one of said first group of light sources or said at least one second group of light sources or the whole of said plurality of light sources to be powered selectively; and
    control means that allow control of the activation state of said supply circuit and the state of said switching means when a changeover from powering the whole of said plurality of light sources to powering one or just some of said first group of light sources and said at least one second group of light sources is required;
    wherein said control means are configured so as to when a changeover from powering the whole of said plurality of light sources to powering said at least one second group of light sources;
    receive a signal indicating said required changeover, then
    deactivate said supply circuit, then
    changeover said switching means, while said supply circuit is deactivated, so as to short said first group of light sources;
    reactivate said supply circuit;
    wherein said supply circuit is deactivated for 100 to 200 microseconds on reception of said signal, and in that said changeover of said switching means is performed with a delay relative to said reception of said signal.

2. The device according to claim 1, wherein said plurality of light sources is made up of said first group of light sources comprising said at least one light source, wherein said first group of light sources is connected in series with said at least one second group of light sources comprising said at least one light source.

3. A method for driving the supply of power to a plurality of light sources that is made up of a first group of light sources comprising at least one light source, said method utilizing a device according to claim 1, wherein said first group of light sources is connected in series with a second group of light sources comprising at least one source, comprising the following steps:
    provision of a supply circuit to which said plurality of light sources is connected as a load;
    provision of switching means that allow said second group of light sources or said plurality of light sources to be powered selectively;
    wherein said method moreover comprises the following step:
    controlling an activation state of said supply circuit and a state of said switching means when a changeover from powering the whole of said plurality of light sources to powering said second group of light sources is required.

4. The method according to claim 3, wherein said method comprises the following steps:
    reception of a signal indicating said required changeover, then
    deactivation of said supply circuit, then
    changeover of said switching means, while said supply circuit is deactivated, so as to short said first group of light sources;
    reactivation of said supply circuit.

5. The device according to claim 1, wherein said delay is of the order of 50 to 100 microseconds.

6. The device according to claim 1, wherein said control means comprise an electronic circuit that performs a changeover delay function.

7. The device according to claim 1, wherein said control means comprise an electronic circuit that performs a deactivation function for a drive circuit.

8. The device according to claim 1, wherein said control means comprise a microcontroller element configured so as to perform a changeover delay function and/or a deactivation function for a drive circuit.

9. A lighting device for an automotive vehicle, said lighting device comprising means for driving a supply of power to said plurality of light sources that is made up of said first group of light sources comprising said at least one light source, which said first group of light sources is connected in series with said at least one second group of light sources comprising said at least one light source, wherein said drive means are in accordance with the device according to claim 1.

10. The device according to claim 1, wherein said first group of light sources and/or said at least one second group of light sources comprises said plurality of light sources connected in series.

11. The device according to claim 1, wherein said plurality of light sources comprise a semiconductor component, particularly a light emitting diode, LED.

12. The lighting device according to claim 9, wherein said first group of light sources alone implements a "low beam" lighting function, and in that said first group of light sources and said at least one second group of light sources together implement a "high beam" lighting function.

13. A device for driving the supply of power to a plurality of light sources that is made up of a first group of light sources comprising at least one light source, which said first group of light sources is connected in series with at least one second group of light sources comprising at least one light source, said device comprising:
    a supply circuit to which said plurality of light sources is connected as a load;
    switching means that allow at least one of said first group of light sources or said at least one second group of light sources or the whole of said plurality of light sources to be powered selectively; and
    control means that allow control of the activation state of said supply circuit and the state of said switching means when a changeover from powering the whole of said plurality of light sources to powering one or just some of said first group of light sources and said at least one second group of light sources is required;
    wherein said control means comprise a microcontroller element configured so as to perform a changeover delay function and/or a deactivation function for a drive circuit;
    wherein said control means moreover comprise combinational logic means for signals transmitted by said microcontroller element.

14. The device according to claim 13, wherein said control means are configured so as to when a changeover from powering the whole of said plurality of light sources to powering said at least one second group of light sources:

receive a signal indicating said required changeover, then deactivate said supply circuit, then changeover said switching means, while said supply circuit is deactivated, so as to short said first group of light sources;

reactivate said supply circuit.

15. A device for driving the supply of power to a plurality of light sources that is made up of a first group of light sources comprising at least one light source, which said first group of light sources is connected in series with at least one second group of light sources comprising at least one light source, said device comprising:

a supply circuit to which said plurality of light sources is connected as a load;

a switch that allows at least one of said first group of light sources or said at least one second group of light sources or the whole of said plurality of light sources to be powered selectively; and a control that allows control of the activation state of said supply circuit and the state of said switch when a changeover from powering the whole of said plurality of light sources to powering one or just some of said first group of light sources and said at least one second group of light sources is required;

wherein said control is configured so as to when a changeover from powering the whole of said plurality of light sources to powering said at least one second group of light sources;

receive a signal indicating said required changeover, then deactivate said supply circuit, then changeover said switch, while said supply circuit is deactivated, so as to short said first group of light sources;

reactivate said supply circuit;

wherein said supply circuit is deactivated for 100 to 200 microseconds on reception of said signal, and in that said changeover of said switch is performed with a delay relative to said reception of said signal.

16. The device according to claim 15, wherein said delay is of the order of 50 to 100 microseconds.

17. The device according to claim 15, wherein said plurality of light sources is made up of said first group of light sources comprising said at least one light source, wherein said first group of light sources is connected in series with said at least one second group of light sources comprising said at least one light source.

* * * * *